(12) United States Patent
Brown et al.

(10) Patent No.: US 7,086,085 B1
(45) Date of Patent: Aug. 1, 2006

(54) VARIABLE TRUST LEVELS FOR AUTHENTICATION

(76) Inventors: Bruce E Brown, 1684 N. Sage Hen Rd., Orem, UT (US) 84097; Aaron M Brown, 1684 N. Sage Hen Rd., Orem, UT (US) 84097; Bruce-Eric Brown, II, 1684 N. Sage Hen Rd., Orem, UT (US) 84097

( * ) Notice: Subject to any disclaimer, the term of this patent is extended or adjusted under 35 U.S.C. 154(b) by 911 days.

(21) Appl. No.: 09/886,478

(22) Filed: Jun. 20, 2001

Related U.S. Application Data (63) Continuation-in-part of application No. 09/546,805, filed on Apr. 11, 2000.

(60) Provisional application No. 60/213,200, filed on Jun. 21, 2000.

(51) Int. Cl.
*G06F 11/30* (2006.01)

(52) U.S. Cl. .............................. 726/7; 726/26; 726/27

(58) Field of Classification Search ................ 713/182, 713/170, 169; 726/7, 3–4, 26, 27
See application file for complete search history.

(56) References Cited

U.S. PATENT DOCUMENTS

| | | |
|---|---|---|
| 5,390,247 A | 2/1995 | Fischer |
| 5,448,729 A | 9/1995 | Murdock |
| 5,606,609 A | 2/1997 | Houser et al. |
| 5,615,268 A | 3/1997 | Bisbee et al. |
| 5,659,616 A | 8/1997 | Sudia |
| 5,748,738 A | 5/1998 | Bisbee et al. |
| 5,872,848 A | 2/1999 | Romney et al. |
| 6,185,683 B1 | 2/2001 | Ginter et al. |
| 6,263,447 B1 * | 7/2001 | French et al. ............... 713/201 |
| 6,282,658 B1 * | 8/2001 | French et al. ............... 713/201 |
| 6,321,339 B1 * | 11/2001 | French et al. ............... 713/201 |
| 6,408,336 B1 * | 6/2002 | Schneider et al. .......... 709/229 |
| 6,655,585 B1 * | 12/2003 | Shinn ......................... 235/382 |
| 6,658,393 B1 * | 12/2003 | Basch et al. .................. 705/38 |

FOREIGN PATENT DOCUMENTS

| | | |
|---|---|---|
| EP | 0 387 462 A1 | 9/1990 |
| EP | 0 447 341 A2 | 9/1991 |
| WO | WO 98/01807 A1 | 1/1998 |
| WO | WO 98/34167 A2 | 8/1998 |
| WO | WO 00/62143 A1 | 10/2000 |
| WO | WO 00/62220 A1 | 10/2000 |

OTHER PUBLICATIONS

Asay, "Applying Information Technology to Court Case Files: Report of the Utah Electronic Filing Project," 1-16 (Sep. 1994).

Battle et al., "Flexible Information Presentation with XML," *IEE Colloquium Multimedia Databases and MPEG-7*, GB, IEE, London, XP-002128574, 13/1-13/6 (Jan. 29, 1999).

(Continued)

*Primary Examiner*—Norman M. Wright
(74) *Attorney, Agent, or Firm*—Vernon W. Francissen; Francissen Patent Law, P.C.

(57) ABSTRACT

A level of trust is determined based on a combination of scores for one or more successful authentications. Scores indicate relative degrees of reliability for authentications, so that differing authentication methods may correspond to different scores. The determined level of trust can then be used to allow or deny access to a resource, and can be used to specify the type of access that is allowed, if applicable.

11 Claims, 7 Drawing Sheets

OTHER PUBLICATIONS

Burgess Allison, "Technology Update," *Law Practice Management* (Jul./Aug. 1997).

Chief Justice, Extract from the Honourable the Chief Justices' Response at the Opening of the Legal Year 1997, Web page: http://www.supcourt.gov.sg/speeches/cj970104.pdf, 4-6 (Jan. 4, 1997).

EastLake et al., "XML-Signature WG," Web page: http://www.w3.org/Signature/, 1-4 (Sep. 9, 1999).

"Electronic Filing System Brings Order to Mountains of Documents," *The Third Branch*, Web page: http://www.lectlaw.com/files/jud33.htm (Feb. 1996).

Gahtan, "E-Filing of Court Documents a Big Hit," Web page: http://www.gahtan.com/alan/articles/efile.htm (Dec. 9, 1996).

Hillis, "Electronic Court Filing," Web page: http://www.llrx.com/features/efiling.com, (Oct. 1, 1997).

Hillis, "Internet Experiments in Electronic Court Filing," Chapters 1-6, Web. page: http://www.wolfenet.com/~dhillis/efile/toc/htm (Oct. 6, 1997).

James, "Electronic Filing," *Court Technology Bulletin*, 8 (3), Web page: http://www.ncsc.dni.us/ncsc/bulletin/v08n03.htm (May/Jun. 1996).

Merrill, "Toward a Paperless Federal Practice by the Year 2000," *New Jersey Lawyer Magazine*, 178, 10 (Jul./Aug. 1996).

Utah Administrative Office of the Courts, Information Technology and Information Services, "Practitioner's Guide to Electronic Filing in Utah Courts," 1-63 (Jan. 31, 1996).

International Search Report established for PCT/US00/09271.

International Search Report established for PCT/US00/10066.

* cited by examiner

VARIABLE TRUST LEVELS FOR AUTHENTICATION

CROSS-REFERENCE TO RELATED APPLICATIONS

The present application is a continuation-in-part of U.S. patent application Ser. No. 09/546,805, for "Collaborative Creation, Editing, Reviewing, and Signing of Electronic Documents," filed Apr. 11, 2000, the disclosure of which is incorporated herein by reference.

The present application further claims priority from provisional U.S. Patent Application Ser. No. 60/213,200, for "Variable Trust Levels for Authentication," filed Jun. 21, 2000, the disclosure of which is incorporated herein by reference.

The present application is further related to co-pending U.S. patent application Ser. No. 09/335,443, for "System and Method for Document-Driven Processing of Digitally-Signed Electronic Documents," filed on Jun. 17, 1999, the disclosure of which is incorporated herein by reference.

BACKGROUND OF THE INVENTION

1. Field of the Invention

The present invention is related to authentication, and more particularly to providing variable levels of trust in an authentication scheme.

2. Description of the Background Art

Authentication can be defined as the process of determining, to some desired degree of certainty, whether a person, document, or item is authentic; that is, determining whether a person is who he or she purports to be, or that a document or other item is what it purports to be. The desired degree of certainty generally varies according to the context of the authentication, the reason for the authentication, the feasibility of performing more rigorous authentication, and other factors. It is generally known in the art to perform authentication in the context of various actions, and different levels of authentication are employed depending on the nature of the action and on the other factors listed above. For example, in some contexts, an individual signs his or her name to authenticate his identity, whereas in other contexts the person is requested to present a piece of identification such as a driver's license.

One particular context for authentication is electronic commerce, as may be implemented in a client/server environment over a network such as the Internet. In such an application, the identity of an individual seeking to conduct business over the network is verified using some authentication scheme. Examples of authentication schemes applicable in a network-based e-commerce environment include: password entry, detection of Internet Protocol (IP) address, "smartcard" readers, and the like.

Objects, documents, and other items may also be authenticated. For example, the validity of a signed document, or the genuineness of a dollar bill, or the authenticity of a piece of sports memorabilia, may be verified, to some desired degree of certainty, by authentication. Different types of authentication apply to each of these examples, and, depending on the nature of the action involving the item, different levels of certainty are appropriate and feasible.

In the context of an automated authentication scheme, authentication takes place without the involvement of a human being. For example, an automated teller machine (ATM) authenticates a person's identity by verifying that the person has entered a valid and correct personal identification number (PIN) prior to completing a transaction or allowing the person access to the bank account. In addition, the person's possession of a valid ATM card is required (in conjunction with entry of the PIN). As another example, a dollar bill reader authenticates a dollar bill by scanning certain visual characteristics of the bill.

In any such automated authentication scheme, a given degree of confidence, or trust, in the authentication is implicit. This implicit degree of confidence results from a recognition that, while the particular authentication method chosen may not be infallible, it is sufficiently reliable for the application at hand. Generally, more important actions demand more rigorous authentication methods, since the consequences of incorrect authentication are more severe.

In most environments where authentication is performed, a particular authentication method is specified. For example, if a bank customer seeks access to an account via an ATM, an ATM card and PIN are required; if an employee attempts to enter a secured building, a key card and/or thumbprint scan may be required. Whichever authentication method is specified, if authentication according to the specified method is not performed, the action (such as a transaction or interaction) does not go forward. However, such environments typically do not specify a quantified trust level for the authentication method, nor do they specify alternative authentication methods (or combinations thereof) that yield a sufficient trust level to permit the action to go forward. Conventional authentication schemes are, therefore, relatively inflexible, since they typically specify particular authentication methods, rather than specifying trust levels that can be attained in a variety of ways.

For example, in the ATM example discussed above, two separate authentication methods (entry of a PIN and possession of a physical card) are required, and the person is denied access to the account if he or she fails to present those two particular elements. Even if the person is able to present more reliable indicia of his or her identity (such as a thumbprint scan or retinal scan, or answers to secret questions), access will be denied. The ATM is not able to accept alternative authentication methods based on a quantifiable trust level, nor is it able to determine the sufficiency of a particular authentication method or combination of methods based on a quantifiable trust level.

Some authentication schemes do provide alternative authentication methods. For example, a website may prompt a user for his or her password, but may also allow for the fact that the user may have forgotten the password. A "password hint" question may be asked, and the user may be provided with the password information only if the question is correctly answered. Thus, an alternative authentication method is effectively made available to a user. However, such schemes are generally limited in their flexibility, do not allow for a quantifiable trust level, and do not provide for several alternative methods for attaining a specified, desired level of authentication in a truly flexible manner.

What is needed is an authentication scheme that provides greater flexibility than do prior art schemes, without sacrificing security or confidence in the scheme.

What is further needed is an authentication scheme that facilitates specification of a quantified trust level for a given action.

What is further needed is a scheme for quantifying trust levels for various authentication methods.

What is further needed is a mechanism for providing two or more alternative options for authentication methods, or combinations thereof, based on quantifiable trust levels.

What is further needed is an authentication scheme that is capable of operating in many different environments and contexts, based on variable trust levels.

SUMMARY OF THE INVENTION

The present invention quantifies trust levels associated with various authentication methods by assigning a score to each such method. More rigorous authentication methods are associated with higher trust levels, and therefore are assigned higher scores. Conversely, less rigorous authentication methods are assigned lower scores.

Various authentication methods may be provided, each having a score representing the level of trust (i.e. reliability) corresponding to that method. For example, possession of a physical token might be assigned a score of 2; access from a secure (internal) computer might be assigned a score of 3; providing a PIN might be assigned a score of 3; fingerprint verification might be assigned a score of 5; and knowledge of the answer to a secret question might be assigned a score of 2. The score is typically dependent upon a combination of factors that indicate the overall reliability of the authentication method; such factors include, for example, the relative ease with which authentication could be forged, the likelihood of error, the degree of tolerance in the authentication input, and the like.

In the context of authenticating a particular user, a trust level is determined for the user, based upon the sum of the scores of the various authentication methods that are successfully undertaken with respect to the user. Thus, given the example presented, for a user providing a PIN and attempting access from a secure computer, the trust level would be determined to be 3+3=6. For a user whose fingerprint is verified and who also possesses a physical token and provides a PIN, the trust level would be determined to be 5+2+3=10.

A minimum total score is defined for each particular application, transaction, or other action for which authentication is to be performed. Thus, rather than specifying particular authentication methods for particular actions, the present invention provides greater flexibility by allowing any combination of authentication methods that, when combined, provide a sufficiently high score. The minimum total score corresponds to the degree of trust that is deemed to be required before the action is permitted to go forward. Accordingly, based on the trust level associated with a user, a determination can be made as to which documents or other items the user is permitted to access, which type of access shall be permitted (e.g. read-only, modify, delete, and the like), and/or which actions are allowed.

For example, a minimum trust level of 5 may be specified for allowing access to a document. Any user having a trust level of at least 5, which can be attained via any combination of authentication methods adding up to the required minimum score of 5, would be permitted access to the document. Thus, the user is presented with several different options for fulfilling the authentication requirement. The user is free to select any of the combinations that add up to the specified trust level, depending on what is most convenient or available to the user at the time access is desired. The invention thus provides considerable flexibility in authentication methods without sacrificing security or confidence in the authentication scheme.

The authentication scheme of the present invention may be applied in any context where authentication is desired, whether to verify the identity of an individual, document, item, or the like. The scheme may be implemented in automated authentication environments, or in environments where a human being performs the authentication. For example, checking a signature may be performed by some automated means or by visual inspection by a human being.

The minimum trust level for a particular action can be determined by an operator, business entity, or individual having authority to do so. Generally, the minimum trust level is determined according to the nature of the action to be performed. For example, a minimum trust level may be specified for allowing a person to read a document, and a higher minimum trust level may be specified for allowing a person to modify or delete the document. Thus, the authentication scheme of the present invention takes into account the variable trust levels associated with various authentication methods, and further takes into account the particular trust level that may be required or appropriate given the nature of the particular action.

In alternative embodiments, the present invention may be combined with other authentication schemes. For example, a particular authentication method may be specified as absolutely required, with no substitutes permitted, and an additional level of trust may be specified, which may be attained by any combination of sufficiently high-scoring authentication methods.

The drawings depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

For illustrative purposes, the preferred embodiment of the present invention is described in the context of authentication of a user for purposes of document access in an online environment. More specifically, the following description and accompanying drawings depict the use of the invention in the context of a Digital Handshake Server (DHS) so as to allow users to be authenticated based upon a series of authentication methods, in order to determine the level of trust that will be associated with each user within a particular session. The trust level for a user is then used to determine which documents the user will be permitted to access, and what kinds of actions the user will be permitted to take with respect to the documents. Those skilled in the art will recognize that the particular features of the present invention are not limited to a particular environment, software application, or network configuration, and that the following description is merely intended to be illustrative of one embodiment. The scope of the invention is therefore not intended to be limited by the particular implementation described below, but rather defined solely by the claims.

Figure 1:
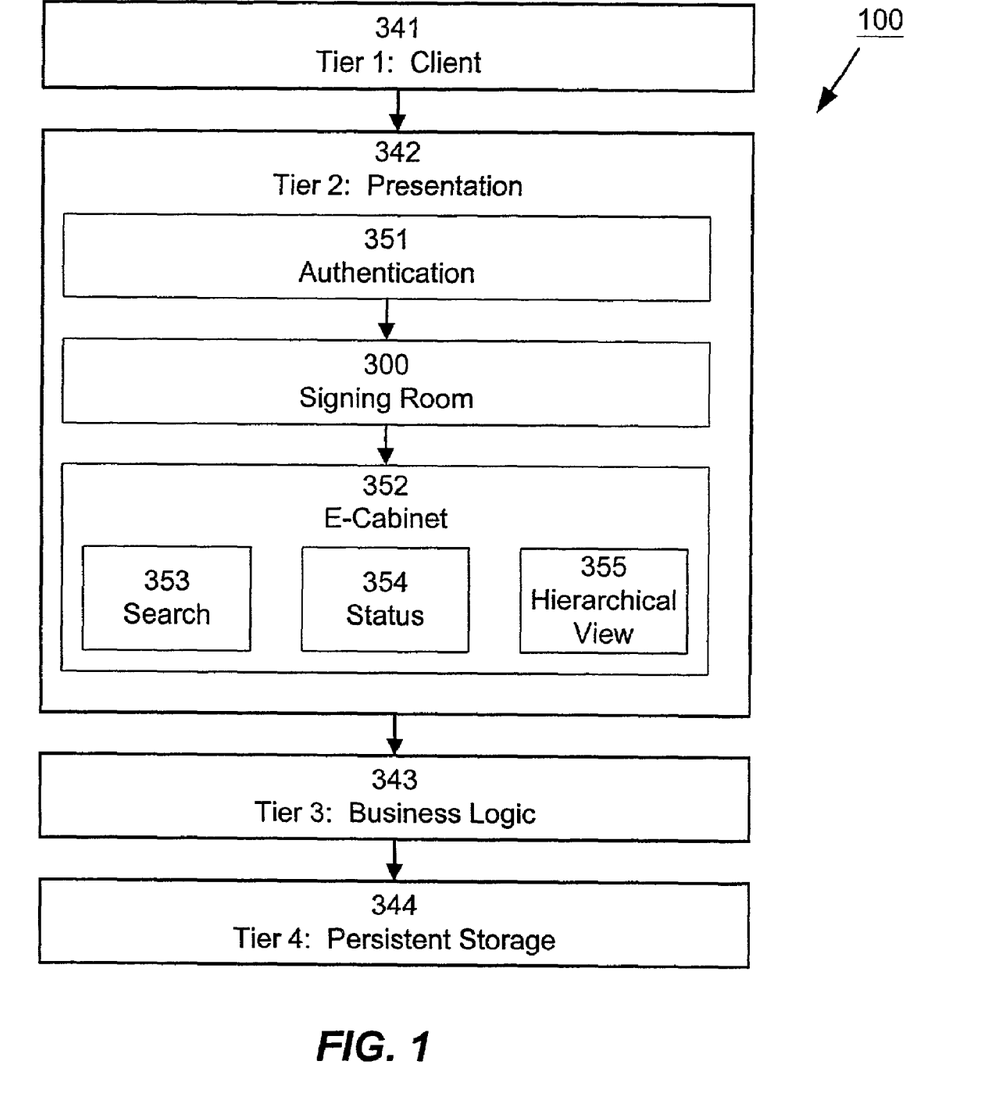
FIG. 1 is a block diagram showing a four-tier architecture for implementing one embodiment of the present invention.

Referring now to FIG. 1, there is shown a four-tier architecture that may be used for implementing one embodiment of the present invention. FIG. 1 depicts an implementation of a Digital Handshake Server (DHS) 100 that forms an environment for executing automated, enforceable online transactions. DHS 100 operates in a network-based client/server environment, such as a web-enabled application that is accessible over the Internet. Details of the operation of the DHS are provided in related U.S. patent application Ser. No. 09/546,805, for "Collaborative Creation, Editing, Reviewing, and Signing of Electronic Documents," filed Apr. 11, 2000, and related U.S. patent application Ser. No. 09/335,443, for "System and Method for Document-Driven Processing of Digitally-Signed Electronic Documents," filed on Jun. 17, 1999, the disclosures of which are incorporated herein by reference. Many of the components shown in FIG. 1 are described in more detail in these related U.S. patent applications.

One skilled in the art will recognize that the following implementation, and the architecture depicted in FIG. 1, is merely an example of a particular application of the present invention, and that many other applications and implementations are possible.

The four tiers include, for example:

Client tier 341, such as a conventional browser running on a user's computer;

Presentation tier 342, including functionality for authentication 351, signing room 300, and E-Cabinet 352;

Business logic tier 343, including functionality, such as a Virtual File Clerk (described in more detail below) for processing requests and performing other business functions; and Persistent storage tier 344, including database (RDBMS) and document store.

Tiers interact with one another to perform the functionality of the network-based application, in a manner consistent with techniques that are known in the art.

Client 341 is implemented at the user's computer, and communicates with the other tiers over a network connection. Client 341 runs on a conventional computer that is connected to a network by which DHS 100 can be accessed. In one embodiment, client 341 is a browser application, such as Microsoft Internet Explorer, with which a user can interact and connect to the Internet. Client 341 accepts input from the user and presents output to the user; the authentication methods described herein may thus be applied to input provided by the user via client 341. For example, client 341 may present a password field to be filled in by the user; client 341 then transmits the user-entered password to authentication module 351 of presentation tier 342 for authentication as described below. Alternatively, client 341 may include a fingerprint reader, magnetic strip reader, or any other device for collecting data relevant to authentication and for transmitting the collected data to authentication module 351, described below. Such devices may alternatively be connected directly to module 351, if desired.

Layer 2 of DHS 100 is presentation layer 342, which is implemented in one embodiment using JavaServer Pages™ (JSP) in a conventional web server application environment. Presentation layer 342 generates the user interface elements and screens that are transmitted as Hypertext Markup Language (HTML) pages to client 341 in the context of running the DHS 100 application. Presentation layer 342 includes, for example:

authentication module 351, which includes mechanisms for performing authentication as described below;

signing room module 300, which generates and presents a collaborative online environment for generating and signing documents, as described in more detail in the above-referenced related patent applications; and electronic cabinet (E-cabinet) 352, for providing (subject to authentication) access to stored documents. E-Cabinet 352 is a presentation-level tier application that provides access to a repository of documents, such as may be stored in persistent storage tier 344 (on a database, for example). E-Cabinet 352 may be used, for example, to archive documents after completion of a deal or other transaction. Access to particular documents within E-Cabinet 352, and various operations in connection with such documents, may be permitted or restricted based on the authentication methods described herein.

For example, a user provides a user name, password, and/or additional identity verification such as a digital signature and biometric data. Authentication then takes place according to the techniques described in more detail below, including determination of a level of trust associated with the authentication and with the user. The user then selects a role from a list of available roles in connection with E-Cabinet 352; the available roles may be determined, in part, by the determined level of trust. The roles may permit different types of access to various documents, depending on the determined level of trust. E-Cabinet 352 presents the user, via a browser, with a list of documents that are relevant to the user and his or her selected role.

In one embodiment, various views and modes of accessing documents may be provided, including a search function 353, status report 354 as to selected documents, and hierarchical display 355 of documents. Search function 353 may provide, for example, full text indexing and searching, and/or field-specific search functionality for documents in the E-Cabinet 352 (which are stored in persistent storage tier 344 such as a database).

Business logic tier 343, such as a virtual file clerk, processes requests made by the user, retrieves the appropriate data from persistent storage tier 344, filters the results so that they only contain information to which the user has access, and provides the documents for display in client tier 341. In one embodiment, the various functions, operations, and displays that are provided by presentation tier 342 and business logic tier 343 are made available to selected users depending on a determined level of trust according to the authentication methods of the present invention.

Persistent storage tier 344 is implemented, for example, as a conventional relational database and/or document store. Business logic 343 interacts with persistent storage 344 in a conventional manner to store and retrieve documents from persistent storage tier 344 in accordance with authentication methods and determined levels of trust as described herein. For example, if a determined level of trust indicates that a user is allowed to read a document, but not to modify it, business logic 343 will only allow retrieval of the document from persistent storage 344, but will not modify or overwrite the stored document responsive to the user's request. On the other hand, if the determined level of trust indicates that the user is allowed to read and modify the document, business logic 343 allows retrieval of the document from storage 344, allows the user to modify the document, and stores the modified document in accordance with the user's commands. In one embodiment, access may be controlled at a sub-document level, so that, given a determined trust level for a user, business logic 343 may allow access to some portions of a document but not others, or may allow different types of access and/or actions for different portions of the document.

As can be seen from the above description, the trust level associated with a user is a determining factor in allowing or denying many of the operations performed by the various components of DHS 100.

Figure 5:
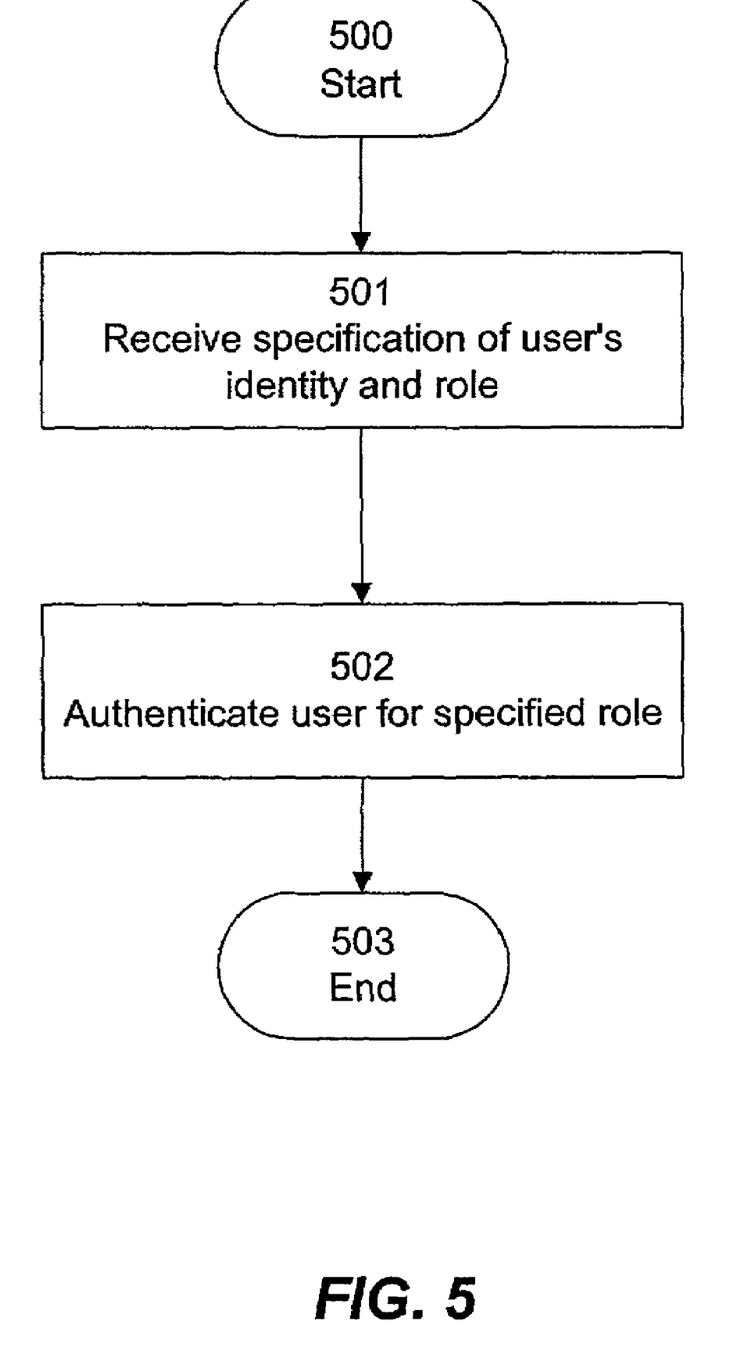
FIG. 5 is a flow diagram of a method for authenticating a user for a role, according to one embodiment of the present invention.

Referring now to FIG. 5, there is shown a flowchart illustrating a method for authenticating a user for a role, according to one embodiment of the present invention, in the context of the user entering signing room 300. One skilled in the art will recognize that the authentication methods described herein can be applied to any context for determining a trust level and allowing or denying access to a resource. In the particular method depicted in FIG. 5, the authentication methods of the present invention are applied to the selection and application of a user's role in the context of signing room 300. The identity of the user attempting to enter signing room 300 is requested 501. Such information is collected, for example, via user entry of a user name, reading of a smartcard, or by other means. The user may also be given an opportunity to select a role in connection with the particular transaction or signing room 501. In an alternative embodiment, the user selects such a role after authentication of the user's identity takes place; thus, the particular roles offered to the user may be determined based on the authentication of the user's identity. In yet another embodiment, a role is automatically selected for the user based on his or her authenticated identity.

Authentication module 351 authenticates 502 the user for the specified role. In the context of signing room 300, authentication module 351 verifies the identity of the party before the party is allowed to perform a particular action, such as reading, modifying, or signing a document in the specified role or capacity. If the authentication is unsuccessful, the authentication module 351 detects and prevents the unauthorized access.

Authentication module 351 may use any authentication technique that is appropriate for the application at hand. Many such authentication techniques are known in the art. The following are examples of authentication techniques that may be used in connection with the present invention, though one skilled in the art will recognize that many other techniques may be applied without departing from the essential characteristics of the invention:

Password: The user enters a password, and the entry is compared with a stored password record for that user. If a match is found, authentication is successful.

Smartcard or other token: The user is in possession of a physical token, such as a card, magnetic key, or the like. The card may include, for example, a magnetic or optical strip that can be scanned by a machine. Smartcards and smartcard readers are available from a variety of sources, such as Micro-modular Data Solutions of Santa Clara, Calif. In one embodiment, the smartcard operates via a public-key encryption technique. A private key encoded within the smartcard encrypts a standard message. Authentication module 351 attempts to decrypt the message using the party's public key, which may be obtained from a public key database or the like using a standard protocol, such as the Lightweight Directory Access Protocol (LDAP), which is part of the X.500 standards. If the message is successfully decrypted, the smartcard is known to contain the private key of the authorized signer, and authentication is deemed to be successful.

Processor identification: The user's computer has a verifiable unique identifier that is associated with the user. It is known in the art that some processors have unique serial numbers that can be transmitted and associated with a user for authentication and security purposes.

Biometric verification: This may include any type of biometric scan, such as fingerprint, retina, iris, voice, face, and the like. Such techniques may be combined with smartcard technology, for example. Thus, the smartcard may contain previously-acquired biometric data of the signer, such as digitized fingerprints, voiceprints, facial configurations, retinal or iris images, and the like, which may be compared with new biometric data obtained at the time of authentication using a biometric data acquisition device (not shown). Biometric data acquisition devices are well known in the art and may be obtained from a variety of sources. For example, fingerprint identification systems may be obtained from Digital Persona, of Redwood City, Calif. Likewise, SAFlink Corp., of Tampa, Fla. provides a system for voice, face and fingerprint recognition. IriScan, Inc. of Marlton, N.J. provides a system for iris scanning. If the previously acquired data substantially matches the new biometric data (within acceptable tolerances for noise and other effects), authentication is considered to be successful.

IP address. The user's location, and in particular whether he or she is using a computer that is located on the premises of the company, is determined. Presumably, some level of trust is associated with the user's presence on the company's premises.

Each of the above-listed authentication methods, and any other authentication methods that are appropriate for the application at hand, may be associated with a particular score reflecting the relative degree of trust associated with the method. Those methods that are more trustworthy are generally assigned higher scores. For example, the following scores might be associated with the above-listed methods:

Password: 2;
Smartcard or other token: 3;
Processor identification: 4;
Fingerprint: 5; and
IP address: 3.

Based on the sum of the scores for the successful authentication techniques for a given user, access may be allowed or denied, or a role may be offered or denied to the user. Access may include, for example, entry to signing room 300, permission to perform particular actions with respect to certain documents, and the like; roles may include any relevant roles for the application at hand. Various thresholds can be set for each such action or role, so that the particular choices made available to a user depend on the determined trust level.

Figure 2:
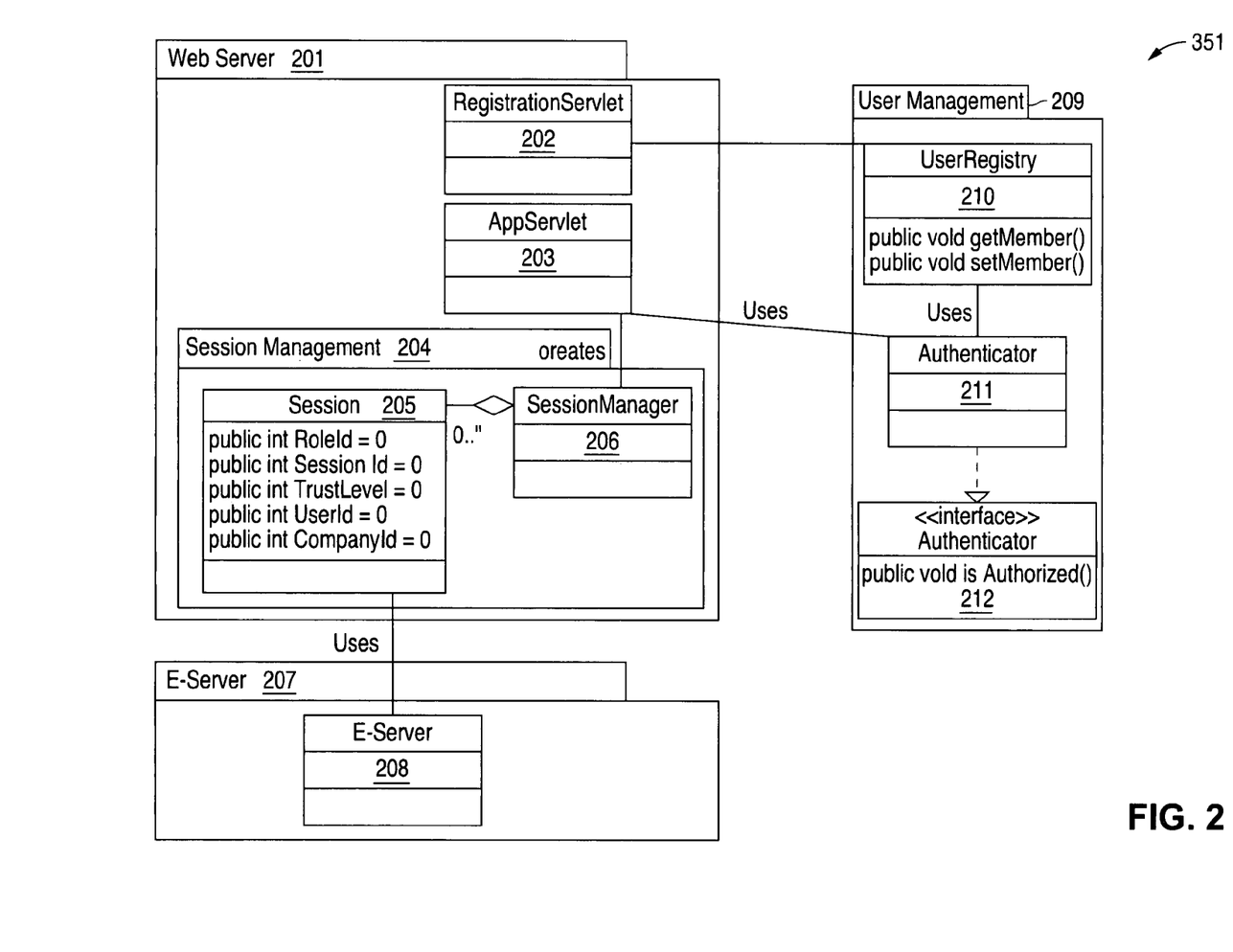
FIG. 2 is a block diagram of a conceptual model for an authentication scheme according to one embodiment of the present invention.

Referring now to FIG. 2, there is shown a block diagram of a conceptual model for an authentication scheme according to one embodiment of the present invention. The conceptual model depicted in FIG. 2 may be implemented, for example, within authentication module 351 as shown in FIG. 1. One skilled in the art will recognize that the various functional and conceptual components of FIG. 2 are merely illustrative of one implementation of the present invention.

According to the conceptual model of FIG. 2, authentication module 351 is implemented by three components: web server 201, e-server 207, and user management module 209.

Web server 201 is implemented for directing data and messages between clients and servlets, as is known in the art for web-based client/server applications. In one embodiment, web server 201 includes registration servlet 202, app servlet 203, and session management module 204. Registration servlet 202 requests information from the user, specifying the user's identity and providing appropriate input for authentication (e.g. password, thumbprint, etc.) Such input may be provided by the user, by any appropriate means, such as form fields within a web page, card reader connected to the user's computer, and the like. In one embodiment, registration servlet may consult a "cookie" stored on the user's computer that identifies the user automatically without requiring the user to provide input. App servlet 203 contains the code for implementing the particular application with which the user is attempting to interact. Session management module 204 controls the allocation, creation, and maintenance of user sessions 205 for interaction with App servlet 203. Each such session 205 is associated with values for variables relevant to the operation of the application. Such variables may include, for example, trust levels, user identifiers, and the like. Session manager 206 contains the actual code for reading and modifying data for user sessions 205. In one embodiment, web server 201 is implemented as part of authentication module 351. Web server 201 may be implemented using any commercially available or conventional web server as is known in the art. For example, the Apache Web Server may be used.

E-server 207, containing e-server module 208, manages the documents that are being displayed in a session.

User management module 209 performs operations related to reading and updating user records in connection with the authentication scheme. UserRegistry component 210 contains methods getMember( ), for obtaining user data, and setMember( ), for writing and modifying user data. Authenticator component 211 contains code for performing the authentication techniques of the present invention. In one embodiment, UserRegistry component 210 uses authenticator component 211 to determine appropriate authentication information with respect to user records obtained and updated using getMember( ) and setMember( ). Authenticator component 211 calls an is Authorized( ) method 212 which determines whether a user is authorized to perform a particular action, based on his or her trust level, in accordance with the techniques of the present invention.

In one embodiment, the present invention operates in the context of a user session. A user session, as is known in the art, represents a series of actions that form a coherent interaction between a user and an application. Once a user has been authenticated, assigned a role, and entered signing room 300, the authentication and role assignment are maintained for the duration of the session (unless a time-out or other supervening event occurs). Thus, over the course of the session, the user has access to documents and/or other items, based on the trust level and corresponding role assigned to the user. In the course of the session, the user may perform actions according to the trust level and the role.

Figure 3:
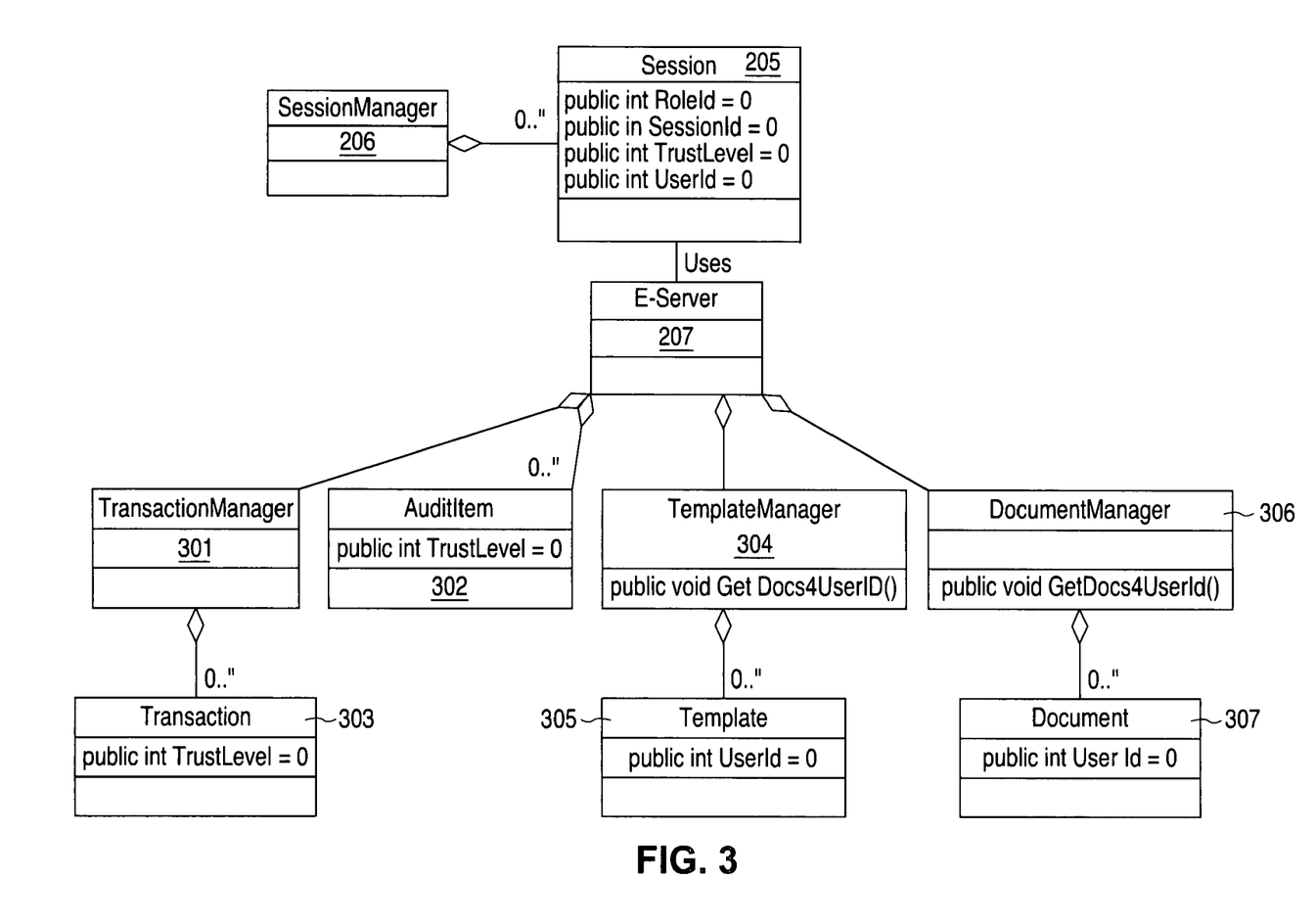
FIG. 3 is a block diagram of a conceptual model for an e-server employing an authentication scheme according to one embodiment of the present invention.

Referring now to FIG. 3, there is shown a block diagram of a conceptual model for an e-server 207 employing an authentication scheme according to one embodiment of the present invention. E-server 207 calls upon a transaction manager 301 to execute document-processing steps for transaction 303. In one embodiment, e-server 207 logs each action taken with respect to a document, and maintains an audit trail for storage of audit items 302. In one embodiment, e-server 207 calls template manager 304 to retrieve a blank document, or template 305, that then becomes a work-in-progress document 307 to be managed by document manager 306. For each session, the user's role and trust level is verified, and then the user is presented one or more blank documents (based on templates 305), as well as any documents that are already in progress (work-in-progress documents 307). Template manager 304 and document manager 306 keep track of the templates 305 and documents 307, respectively. Transaction manager 301 is called in response to events or actions to move the transaction forward. Actions are recorded as audit items 302.

Figure 4:
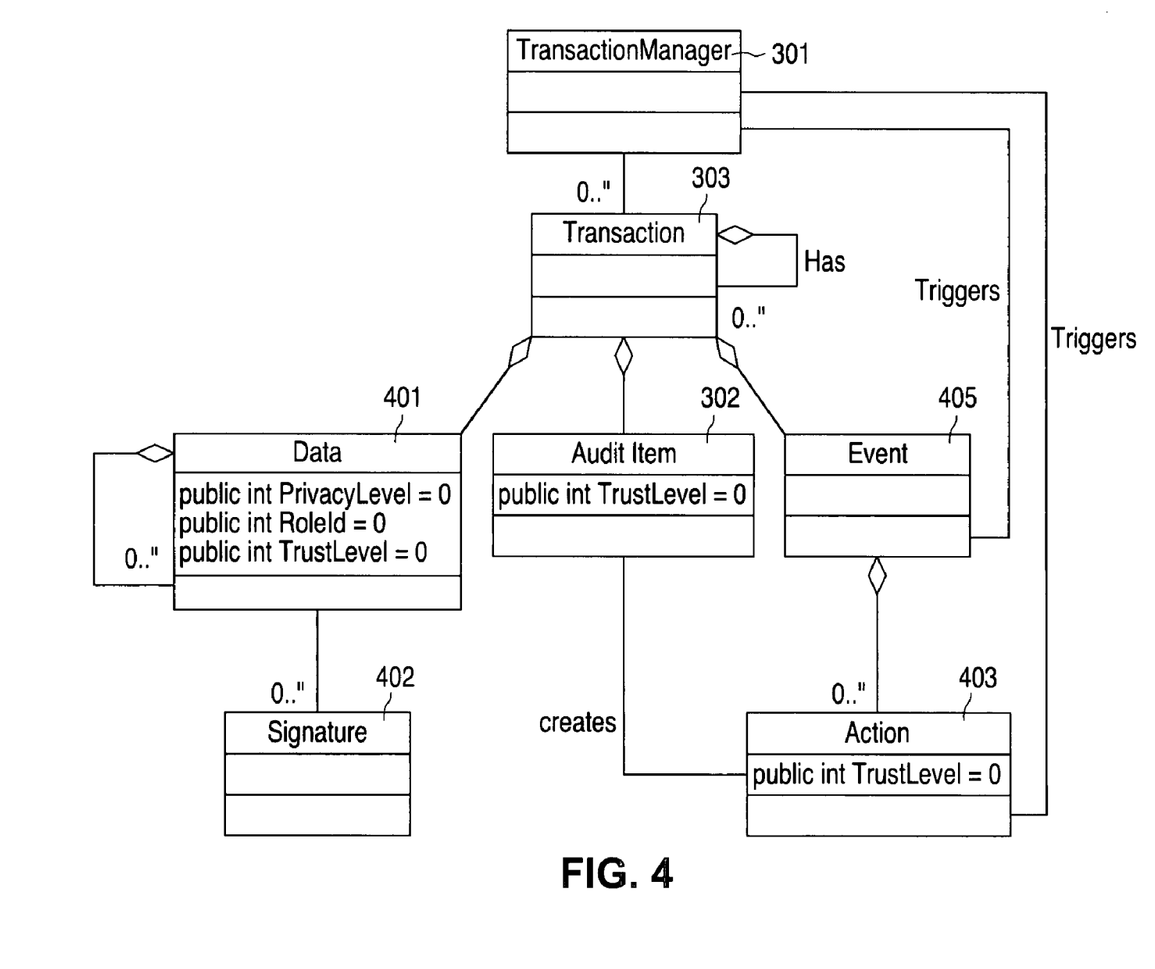
FIG. 4 is a block diagram of a conceptual model for a transaction, according to one embodiment of the present invention.

Referring now to FIG. 4, there is shown a block diagram of a conceptual model for a transaction, according to one embodiment of the present invention. Transaction manager 301 manages the progress of transactions 303. Each document 307 has a set of events 405 associated with it. Each event 405 corresponds to an action 403 that processes document 307 by extracting data from it, adding data to it, validating data, or performing some other operation. Events 405 and/or actions 403 trigger transaction manager 301 to initiate or further transactions 303. Data 401 in document 307 is manipulated accordingly, and signatures 402 may be added if appropriate.

Figure 6:
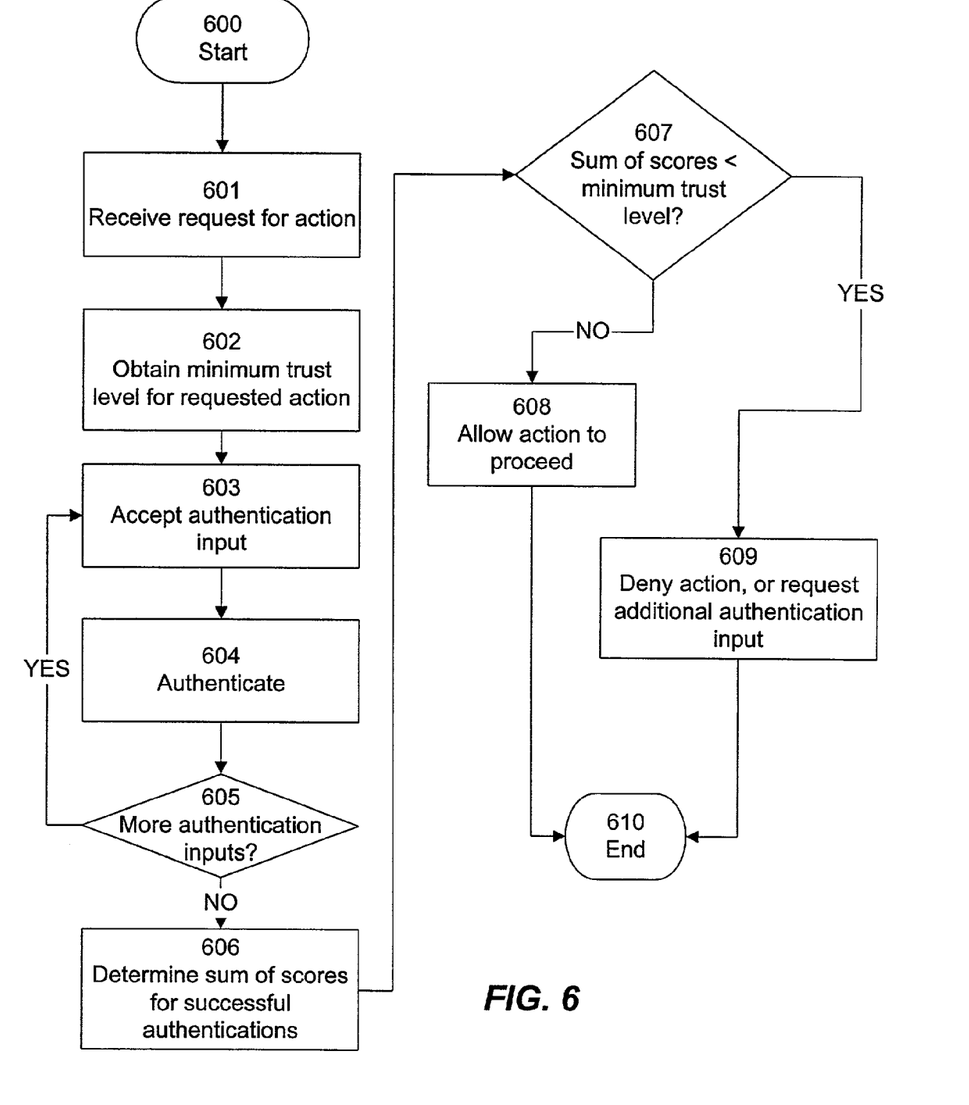
FIG. 6 is a flow diagram of an authentication method according to one embodiment of the present invention.

Referring now to FIG. 6, there is shown a flow diagram of an authentication method according to one embodiment of the present invention. In the method of FIG. 6, a received action request is allowed or denied depending on the minimum trust level specified for the action and on the sum of the authentication scores received in connection with the action request. Thus, this method would be used, for example, in an interaction in which the user is presented with a number of actions, some of which may be permitted and some of which may be denied, depending on his or her authentication score. Such an interaction may take place, for example, in the context of an online signing room application as described above, or in any other context in which user authentication or item authentication is desired.

A request for an action is received 601. Such a request may be user-initiated, or it may be initiated by some other means, automated or otherwise. The request may be received via any input or communication channel, such as for example receiving a file transfer request, command, keystroke, button press, and the like. The request may be received over a network, such as in web-based client/server application, or at a local computer, or by any other means. The request may specify any type of action, include reading, modifying, deleting, signing, and the like. The object of the request may be a document or any other type of resource.

Once the request is received 601, a minimum trust level for performing the requested action is obtained 602. In one embodiment, minimum trust levels are stored in a database, keyed to particular action types and resources. Thus, given a requested action and an object of the action, the database is consulted to obtain a minimum trust level. One example for the database layout is provided in more detail below. One skilled in the art will recognize that other mechanisms may be provided for obtaining a minimum trust level. For example, default levels may be provided, or automated schemes for deriving a trust level given various factors and inputs may be developed. Minimum trust levels for particular actions and resources may be dependent on any factors that are deemed relevant.

Authentication input is then accepted 603. In one embodiment, the user may be prompted to enter authentication input, such as a password, thumbprint scan, magnetically striped card swipe, voice, answer to secret question, and the like. Such input may be provided by any input means as may be known in the art, including for example keyboard entry, mouse, biometric scan, microphone, and the like. The input may require presentation of a token such as a magnetically striped card or physical key. The input may be collected at a local or remote location and transmitted to the authenticating apparatus, via a network connection or by other means.

The input is then authenticated 604. The specific authentication mechanism depends upon the nature of the authentication input. For example, if a password is entered, authentication 604 is performed by comparing the entered password with a stored password record. If a biometric scan is provided, authentication 604 is performed by checking for a match, within a predetermined tolerance, against stored biometric data. Other authentication mechanisms may be used, as are known in the art, and as may be appropriate for the particular authentication input accepted in 603.

If additional authentication inputs are provided 605, steps 603 and 604 are repeated. In one embodiment, the user may be given the opportunity to provide several authentication inputs, either in succession or simultaneously, as appropriate. In one embodiment, the user may provide these inputs in any order he or she desires. In one embodiment, the user is given an opportunity to indicate that he or she is finished providing authentication inputs.

As described in more detail above, each authentication method has a score that indicates a degree of trust. More rigorous authentication methods are associated with higher levels of trust, and therefore are assigned higher scores. Conversely, less rigorous authentication methods are assigned lower scores. An overall score representing a degree of trust in the combined authentication methods presented in 603 is determined 606. In one embodiment, the overall score is determined by taking a sum of the scores for all successful authentications. In another embodiment, some other mechanism for developing an overall score is used; the highest score among the successful authentication methods may be taken as the overall score, or some other methodology for combining scores may be employed.

The overall score developed in 606 is compared 607 with a predetermined minimum trust level for the action requested in 601. The minimum trust level indicates a relative degree of trust that is deemed to be required before the action is permitted to proceed; presumably, higher minimum trust levels would generally be associated with more sensitive actions or those requiring higher degrees of fraud protection and security (such as those dealing with confidential information or substantial sums of money).

If the overall score is less than the minimum trust level for the requested action, the action is denied 609. In one embodiment, the denial of the trust level is communicated to the user via an on-screen message, icon, audio message, web page, or by any other communication means. In one embodiment, the user is given an opportunity to provide additional authentication input so that the overall score can be increased. If such additional authentication input is provided, the method returns to step 603 to combine the new input with previously provided authentication inputs and to develop a new combined score.

If the overall score is greater than or equal to the minimum trust level for the requested action, the action is allowed to proceed 608. For example, if the user had requested to read a document, the document is retrieved and presented to the user. If the user had requested to withdraw cash from a bank account, the cash is provided. The actual mechanism for effecting the action (once the authentication method of the present invention has been successfully applied) may be implemented according to any technique known in the art. In one embodiment, the requested action constitutes assigning a role that, in turn, permits other actions to be performed in the course of a user session.

Figure 7:
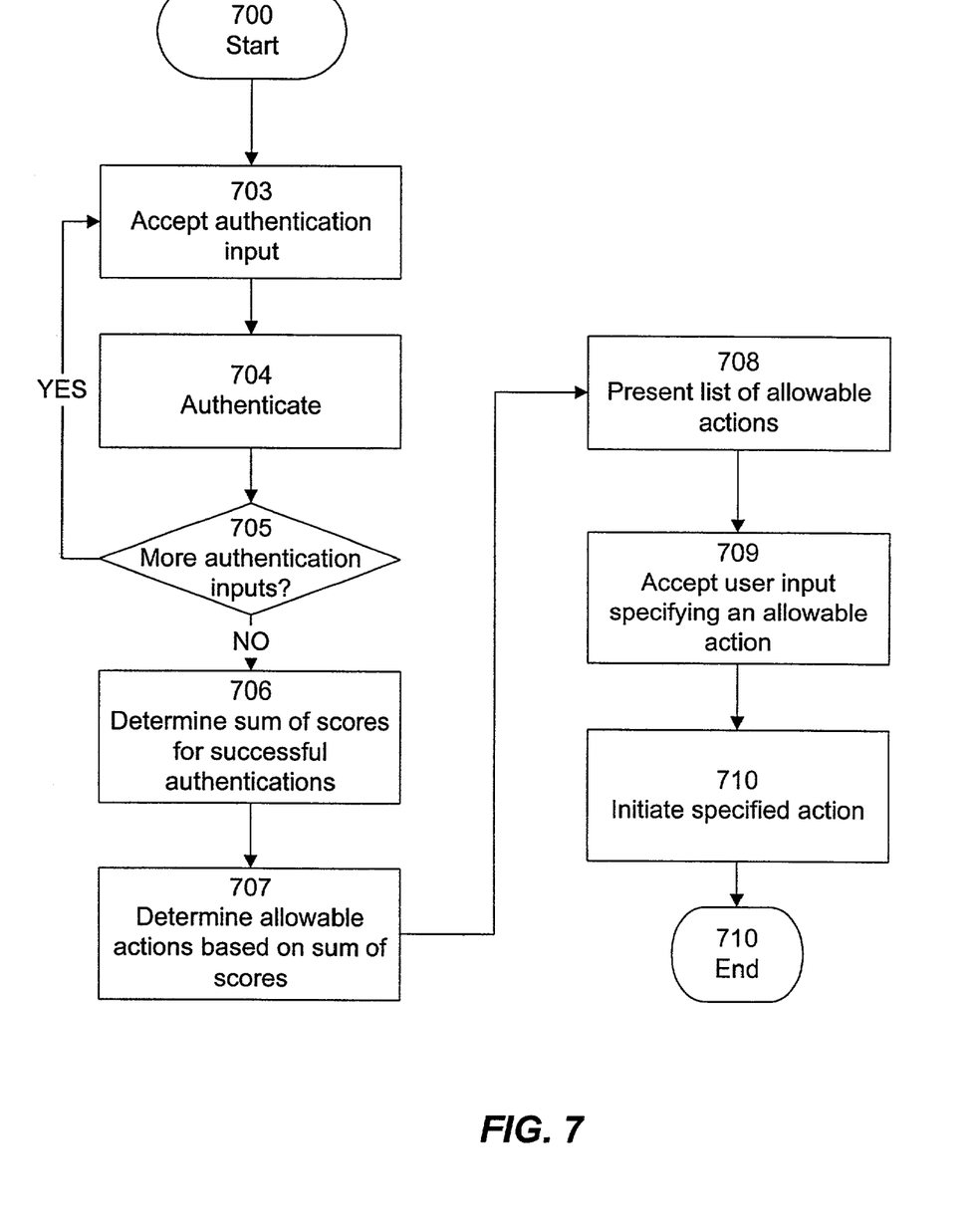
FIG. 7 is a flow diagram of an authentication method according to another embodiment of the present invention.

Referring now to FIG. 7, there is shown a flow diagram of an authentication method according to another embodiment of the present invention. In the method of FIG. 7, an authentication score is determined first, and the invention only presents those actions that are allowable given the determined score. Thus, this method would be used, for example, in an interaction in which the user identifies himself or herself, provides authentication input, and is then presented with a number of choices for further action. Such an interaction may take place, for example, in the context of an online signing room application as described above, or in any other context in which user authentication or item authentication is desired. One advantage of the method of FIG. 7 is that the user is not presented with action options that are not available to him or her. Alternatively, such options may be presented, but in a format that indicates that such options are not available given the authentication input that has been provided; for example, options that require a higher trust level could be displayed in a "grayed-out" format or other unique visual style.

Authentication input is accepted 703 and the input is authenticated 704, as described above in connection with steps 603 and 604 of FIG. 6. If additional authentication inputs are provided 705, steps 703 and 704 are repeated. As described above, in various embodiments, the user may be given the opportunity to provide several authentication inputs, either in succession or simultaneously, and/or may provide these inputs in any order he or she desires, and/or is given an opportunity to indicate that he or she is finished providing authentication inputs.

An overall score representing a degree of trust in the authentication methods presented in 703 is determined 706, as described above in connection with step 606 of FIG. 6. The overall score may be determined by taking a sum of the scores for all successful authentications, or by some other combining methodology.

Based on the overall score determined in 706, a set of allowable actions is defined. This set of actions includes all actions appropriate to the context of the application that have a minimum trust level less than or equal to the overall score. In one embodiment, the set of actions is limited or expanded by other considerations or factors extraneous to the operation of the invention.

The set of allowable actions is presented 708. In one embodiment, they are presented as a series of menu options, or buttons, or icons, or by another means appropriate to the application. For example, a web page may be presented that contains hyperlinks or buttons corresponding to the various allowable actions. In one embodiment, non-allowable actions are not displayed. In another embodiment, non-allowable actions are displayed in a different text style or color, or in a different area of the screen, or using some other visual or nonvisual technique for indicating that they are non-allowable (and presumably non-selectable). In yet another embodiment, the user may be given an opportunity to provide additional authentication input so as to cause one or more non-allowable actions to become allowable by virtue of an increase in the overall authentication score for the user. In yet another embodiment, the list of non-allowable actions is initially presented, and individual non-allowable actions become allowable (and are indicated as such) as the user provides additional authentication input that sufficiently increases the overall authentication score.

The user is given an opportunity to select one of the allowable actions. User input specifying an allowable action is accepted 709. The input may take the form of a request for an action as described above in connection with step 601 of FIG. 6.

The action is then initiated in accordance with the user's request 710. The actual mechanism for effecting the action (once the authentication method of the present invention has been successfully applied) may be implemented according to any technique known in the art.

Database Tables

In one embodiment, database tables are maintained in storage tier 344 in order to implement the variable trust levels of the present invention. The following are examples of database table layouts for internal tracking of users, signing rooms, and the like, for practicing one embodiment of the present invention. One skilled in the art will recognize that many other database table layouts and schemas, or other formats, parameters, and labels, could be used without departing from the essential characteristics of the present invention. In the following tables, NULL indicates that nodata is required; NOT NULL indicates that, in one embodiment, data is required.

LM_ROLE_ACL

| | | | |
|---|---|---|---|
| ROLE_ACL_ID (Primary Key) | For each role, there is an access control list; ROLE_ACL_ID is used to refer to the role by other tables | NUMBER(10,0) | NOT NULL |
| ENTITY | Name or other indication of the owner/organization; may be blank | VARCHAR2(40) | NULL |
| ACCESS_LEVEL | Current trust level of the user's current login | NUMBER(10,0) | NOT NULL |
| MIN_AUTH_STRENGTH | Minimum trust level the user must have to use this role | NUMBER(10,0) | NOT NULL |
| NAME | Name of the role; may be blank | VARCHAR2(80) | NULL |
| ROLE_ID (Foreign key; points to another table) | ID number of the role | NUMBER(10,0) | NOT NULL |

Table LM_ROLE_ACL (Role Access Control List) is used by user registry 210 to define a role for the user and the current trust level (ACCESS_LEVEL). This table has the minimum authentication strength value (MIN_AUTH_STRENGTH) that is the minimum trust level for this role. If the user is not authenticated at this minimum, then he or she is denied service.

LM_TSIGNING_ROOM_ACL

| | | | |
|---|---|---|---|
| SIGNING_ROOM_ACL_ID (Primary Key) | For each signing room, there is an access control list; SIGNING_ROOM_ACL_ID is used to refer to this signing room by other tables | NUMBER(10,0) | NOT NULL |
| NAME | Name of the signing room for display purposes; may be blank | VARCHAR2(80) | NULL |
| ACCESS_LEVEL | Current trust level of the user's current login | NUMBER(10,0) | NOT NULL |
| MIN_AUTH_STRENGTH | Minimum trust level the user must have to use this signing room | NUMBER(10,0) | NOT NULL |
| ROLE_ID (Foreign key; points to another table) | Pointer to the user's role identification number | NUMBER(10,0) | NOT NULL |
| USER_ID (Foreign key; points to another table) | Pointer to the user's name | NUMBER(10,0) | NOT NULL |
| SIGNING_ROOM_ID (Foreign key; points to another table) | Pointer to the signing room's identification number | NUMBER(10,0) | NOT NULL |

In one embodiment, table LM_TSIGNING_ROOM_ACL (Signing Room Access Control List) is created for each signing room 300.

LM_TMPL_SIG_LINE_ACL

| | | | |
|---|---|---|---|
| TMPL_SIG_LINE_ACL_ID (Primary Key) | The template's signature line access control list identification number | NUMBER(10,0) | NOT NULL |
| ACCESS_LEVEL | Current trust level of the user's current login | NUMBER(10,0) | NOT NULL |
| MIN_AUTH_STRENGTH | Minimum trust level the user must have to use this signing room | NUMBER(10,0) | NOT NULL |
| NAME | Name of the user who can sign on this line; may be blank | VARCHAR2(80) | NULL |
| ROLE_ID (Foreign key; points to another table) | Pointer to the user's role identification number | NUMBER(10,0) | NOT NULL |
| USER_ID (Foreign key; points to another table) | Pointer to the user's name | NUMBER(10,0) | NOT NULL |
| TMPL_SIGNATURE_LINE_ID (Foreign key; points to another table) | Identification number of the signature line in the template | NUMBER(10,0) | NOT NULL |
| TEMPLATE_ID (Foreign key; points to another table) | Identification number of the template | NUMBER(10,0) | NOT NULL |

Within a signing room 300, there are templates (documents that are not filled out) and documents (working drafts). In one embodiment, a LM_TMPL_SIG_LINE_ACL table is associated with every template and each area of the document that will eventually be signed (a signature line). Again the current value of trust (ACCESS_LEVEL) and the minimum allowed (MIN_AUTH_STRENGTH) are specified.

LM_SIGNATURE_LINE_ACL

| | | | |
|---|---|---|---|
| SIGNATURE_LINE_ACL_ID (Primary Key) | Signature lines' access control list identification number | NUMBER(10,0) | NOT NULL |
| ACCESS_LEVEL | Current trust level of the user's current login | NUMBER(1010) | NOT NULL |
| MIN_AUTH_STRENGTH | Minimum trust level the user must have to use this signing room | NUMBER(10,0) | NOT NULL |
| NAME | Name of the user who can sign on this line; may be blank | VARCHAR2(80) | NULL |
| ROLE_ID (Foreign key; points to another table) | Pointer to the user's role identification number | NUMBER(10,0) | NOT NULL |
| USER_ID (Foreign key; points to another table) | Pointer to the user's name | NUMBER(10,0) | NOT NULL |
| SIGNATURE_LINE_ID (Foreign key; points to another table) | Identification number of the signature line | NUMBER(10,0) | NOT NULL |
| WORKING_DRAFT_ID (Foreign key; points to another table) | Pointer to the working draft that this line is used in | NUMBER(10,0) | NOT NULL |

In one embodiment, a LM_SIGNATURE_LINE_ACL table is associated with each document in the database as it is in process.

LM_FOLDER_ACL

| | | | |
|---|---|---|---|
| FOLDER_ACL_ID (Primary Key) | The folder's access control list identification number | NUMBER(10,0) | NOT NULL |
| NAME | The name of the folder containing one or more documents; may be blank | VARCHAR2(80) | NULL |
| ACCESS_LEVEL | Current trust level of the user's current login | NUMBER(10,0) | NOT NULL |
| MIN_AUTH_STRENGTH | Minimum trust level the user must have to use this signing room | NUMBER(10,0) | NOT NULL |
| ROLE_ID (Foreign key; points to another table) | Pointer to the user's role identification number | NUMBER(10,0) | NOT NULL |
| USER_ID (Foreign key; points to another table) | Pointer to the user's name | NUMBER(10,0) | NOT NULL |
| FOLDER_ID (Foreign key; points to another table) | Pointer to the folder's identification number | NUMBER(10,0) | NOT NULL |

In one embodiment, a LM_FOLDER_ACL is associated with each folder in the E-Cabinet 352.

XML Data

The following is an example of XML tags that may be provided within a document template in order to specify a role and a trust level for the document, as well as version information, title, and the like. One skilled in the art will recognize that such information may be encoded in many different ways, without departing from the essential characteristics of the present invention.

```
<iLuminDocument>
    <DocumentInfo>
        <iLuminVersion>3.0</iLuminVersion>
        <TemplateVersion>2.0</TemplateVersion>
        <XmlVersion>1.0</XmlVersion>
        <DocumentType>Mortgage</DocumentType>
        <Title>v2 Freddie Mack form 65 Fannie Mae Form 1003</Title>
        <Description>Uniform Residential Loan Application</Description>
        <Role>Anyone</Role>
        <TrustLevel>4</TrustLevel>
        <ssiFile />
    </DocumentInfo>
    <Data>
```

In one embodiment, when a document is signed, the following tags are added at the end of the document, as described in more detail in the above-referenced related applications. In this example, it can be seen that the authentication strength, designated by the variable <AuthStrength>, is set to 5. Therefore, the user that signed the document was assigned a trust level of 5. In this case, since the minimum trust level was 4 (indicated above by the <TrustLevel> variable being set to 4), the user was authenticated at a higher level than the minimum.

```
    </Data>
    <AuditTrail>
<AuditItem>
    <AuditID>18</AuditID>
    <CreationDate>Jun 20, 2000 10:35:16 AM</CreationDate>
    <AuthStrength>5</AuthStrength>
        <Action>SignDocument</Action>
        <Result>Signature</Result>
    <Note>v2 Freddie Mack form 65 Fannie Mae Form 1003 - v2 1003 - Document signed by Craig Blackham
        https://prototype/servlet/Login?SigningRoomId=15</Note>
        <Type>WorkingDraft</Type>
        <ObjectID>15</ObjectID>
        <UserID>24</UserID>
        <OrganizationID>2</OrganizationID>
    </AuditItem></AuditTrail>
</iLuminDocument>
```

As will be understood by those familiar with the art, the invention may be embodied in other specific forms without departing from the spirit or essential characteristics thereof. For example, the invention may be implemented using any authentication methods, inputs, schemes, or tokens, for both persons and items, and may be implemented in any context where authentication is desired or appropriate. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A method for determining a level of trust in an authenticated identification, comprising:
   performing authentications to obtain authentication results, each authentication having a score, each result indicating whether the corresponding authentication is successful;
   combining the scores for the successful authentications to determine a level of trust;
   responsive to the determined level of trust exceeding a first predetermined threshold, allowing a first level of access to a resource;
   responsive to the determined level of trust exceeding a second predetermined threshold, allowing a second level of access to a resource; and
   wherein the first level of access comprises reading the resource and the second level of access comprises modifying the resource.

2. A method for determining a level of trust in an authenticated identification, comprising:
   performing authentications to obtain authentication results, each authentication having a score, each result indicating whether the corresponding authentication is successful;
   combining the scores for the successful authentications to determine a level of trust;
   receiving a request for an action, the action being associated with a predetermined minimum level of trust;
   responsive to the determined level of trust exceeding the predetermined minimum level of trust, allowing the requested action to proceed; and
   responsive to the determined level of trust not exceeding the predetermined minimum level of trust, denying the requested action.

3. A method for determining a level of trust in an authenticated identification, comprising:
- performing authentications to obtain authentication results, each authentication having a score, each result indicating whether the corresponding authentication is successful;
- combining the scores for the successful authentications to determine a level of trust; and
- presenting a list of allowable actions having minimum trust levels not exceeding the determined level of trust.

4. The method of claim 3, further comprising:
- receiving input specifying one of the presented actions; and
- initiating the specified action.

5. A system for determining a level of trust in an authenticated identification, comprising:
- an authenticator, for performing authentications to obtain authentication results, each authentication having a score, each result indicating whether the corresponding authentication is successful;
- a score combiner, coupled to the authenticator, for combining the scores for the successful authentications to determine a level of trust;
- wherein the authenticator, responsive to the determined level of trust exceeding a first predetermined threshold, allows a first level of access to a resource, and, responsive to the determined level of trust exceeding a second predetermined threshold, allows a second level of access to a resource; and
- wherein the first level of access comprises reading the resource and the second level of access comprises modifying the resource.

6. A system for determining a level of trust in an authenticated identification, comprising:
- an authenticator, for performing authentications to obtain authentication results, each authentication having a score, each result indicating whether the corresponding authentication is successful;
- a score combiner, coupled to the authenticator, for combining the scores for the successful authentications to determine a level of trust; and
- an action input device, coupled to the authenticator, for receiving a request for an action, the action being associated with a predetermined minimum level of trust;
- wherein the authenticator, responsive to the determined level of trust exceeding the predetermined minimum level of trust, allows the requested action to proceed, and, responsive to the determined level of trust not exceeding the predetermined minimum level of trust, denies the requested action.

7. A system for determining a level of trust in an authenticated identification, comprising:
- an authenticator, for performing authentications to obtain authentication results, each authentication having a score, each result indicating whether the corresponding authentication is successful;
- a score combiner, coupled to the authenticator, for combining the scores for the successful authentications to determine a level of trust; and
- an output device, coupled to the authenticator, for presenting a list of allowable actions having minimum trust levels not exceeding the determined level of trust.

8. The system of claim 7, further comprising:
- an input device, coupled to the output device, for receiving input specifying one of the presented actions; and
- a transaction manager, coupled to the input device, for initiating the specified action.

9. A computer-readable medium for determining a level of trust in an authenticated identification, comprising:
- computer-readable code adapted to perform authentications to obtain authentication results, each authentication having a score, each result indicating whether the corresponding authentication is successful;
- computer-readable code adapted to combine the scores for the successful authentications to determine a level of trust; and
- computer-readable code adapted to, responsive to the determined level of trust exceeding a predetermined threshold, offer a user a role for selection.

10. A computer-readable medium for determining a level of trust in an authenticated identification, comprising:
- computer-readable code adapted to perform authentications to obtain authentication results, each authentication having a score, each result indicating whether the corresponding authentication is successful;
- computer-readable code adapted to combine the scores for the successful authentications to determine a level of trust; and
- computer-readable code adapted to, responsive to the determined level of trust exceeding a first predetermined threshold, allow a first level of access to a resource, and, responsive to the determined level of trust exceeding a second predetermined threshold, allowing a second level of access to a resource;
- wherein the first level of access comprises reading the resource and the second level of access comprises modifying the resource.

11. A system for determining a level of trust in an authenticated identification, comprising:
- authenticating means, for performing authentications to obtain authentication results, each authentication having a score, each result indicating whether the corresponding authentication is successful; and
- score combining means, coupled to the authentication means, for combining the scores for the successful authentications to determine a level of trust;
- wherein the authenticating means, responsive to the determined level of trust exceeding a predetermined threshold, offers a user a role for selection.

\* \* \* \* \*